United States Patent [19]
Jensen et al.

[11] 3,856,290
[45] Dec. 24, 1974

[54] APPARATUS FOR COMPRESSING ARTICLE HOLDING RACKS

[75] Inventors: Dennis H. Jensen, New Brighton; Thomas E. McKinley, Minneapolis, both of Minn.

[73] Assignee: M J Manufacturing Consultants, Inc., Minneapolis, Minn.

[22] Filed: Mar. 15, 1973

[21] Appl. No.: 341,474

[52] U.S. Cl.................. 269/14, 29/200 D, 100/53, 204/297 W, 269/23, 269/268
[51] Int. Cl........................... B25b 1/18, C23b 5/70
[58] Field of Search........ 204/198, 202, 203, 297 R, 204/297 W; 118/503; 29/235, 200 D; 269/13, 14, 37, 47, 52; 100/53

[56] References Cited
UNITED STATES PATENTS
| | | | |
|---|---|---|---|
| 2,442,883 | 6/1948 | Tuttle | 204/297 W |
| 2,934,129 | 4/1960 | Wilson et al. | 100/53 UX |
| 3,391,073 | 6/1968 | Rusch et al. | 204/198 X |

*Primary Examiner*—Roy Lake
*Assistant Examiner*—Neil Abrams
*Attorney, Agent, or Firm*—Merchant, Gould, Smith & Edell

[57] ABSTRACT

Apparatus for loading and unloading article racks used in an article anodizing process. The rack consists of a plurality of resilient finger pairs each of which must be compressed before receiving the article. The loading apparatus comprises a press into which the rack is placed and which is capable of simultaneously compressing all finger pairs for article placement. The press is actuated by movement of a transparent safety shield into a protective position, thus preventing injury to the operator. After article placement, the press is released and the rack removed with the articles in place for anodizing. Article unloading is effected by placement of the rack in a similar apparatus which further includes a kick-out member that operates automatically upon actuation of the press. The anodized articles drop onto an inclined vibrating ramp for subsequent collection.

22 Claims, 13 Drawing Figures

3,856,290

APPARATUS FOR COMPRESSING ARTICLE HOLDING RACKS

The invention is directed to apparatus for loading article racks used in an anodizing process, and for unloading the articles following anodization.

Anodizing necessarily involves the proper suspension of the article to be anodized in the electrolytic or depositing solution. A common approach to the anodization of small articles involves the use of a metal rack having a plurality of resilient finger pairs each of which is capable of receiving and retaining an article. Typically, the rack comprises an elongated rod having a supporting hook on one end, and the finger pairs take the form of bent metal strips secured to the supporting rod in opposed relation so that the ends diverge outwardly from the point of affixation. Articles are placed on the rack by manually compressing the fingers or strips together, placing the article over the compressed ends and releasing so that the article is caught by the outward bias of the fingers.

Although this type of rack provides an entirely satisfactory function during the anodizing process, it will be appreciated that the manual placement of articles on the rack and their subsequent removal is a time consuming process, particularly in view of the fact that such racks are capable of handling substantial numbers of articles.

Our invention is directed to apparatus which greatly simplifies the placement of articles on such anodizing racks and their removal after the anodizing process has been completed. More specifically, we provide a pneumatic press which receives the anodizing rack and simultaneously compresses all of the article holding finger pairs to permit placement of the articles thereon. The apparatus is semiautomatic in its operation and includes the safety feature of precluding operation of the press until a transparent shield has been lowered to a safety position surrounding the compressing elements. With the articles placed on the rack in the compressed state, the press is released and the rack removed with the articles in tack for the anodizing process.

Following anodizing, the rack is placed in a like machine which further includes means for removing the articles from the rack. This again involves the simultaneous compressing of all finger pairs, which is immediately and automatically followed by actuation of a kick-out member which simultaneously strikes all anodized articles, causing them to be thrown away from the rack and onto a vibrating ramp for subsequent collection.

Usage of our inventive apparatus in connection with anodizing racks of the type hereinabove described significantly decreases the amount of time previously spent in loading and unloading articles, and effects a concomitant increase in the number of articles which a given worker can handle in a specific unit of time. As such, the inventive apparatus represents an appreciable economization in the anodizing of small articles as the direct result of savings in time and labor.

BRIEF DESCRIPTION OF THE PREFERRED EMBODIMENT

Figure 1:
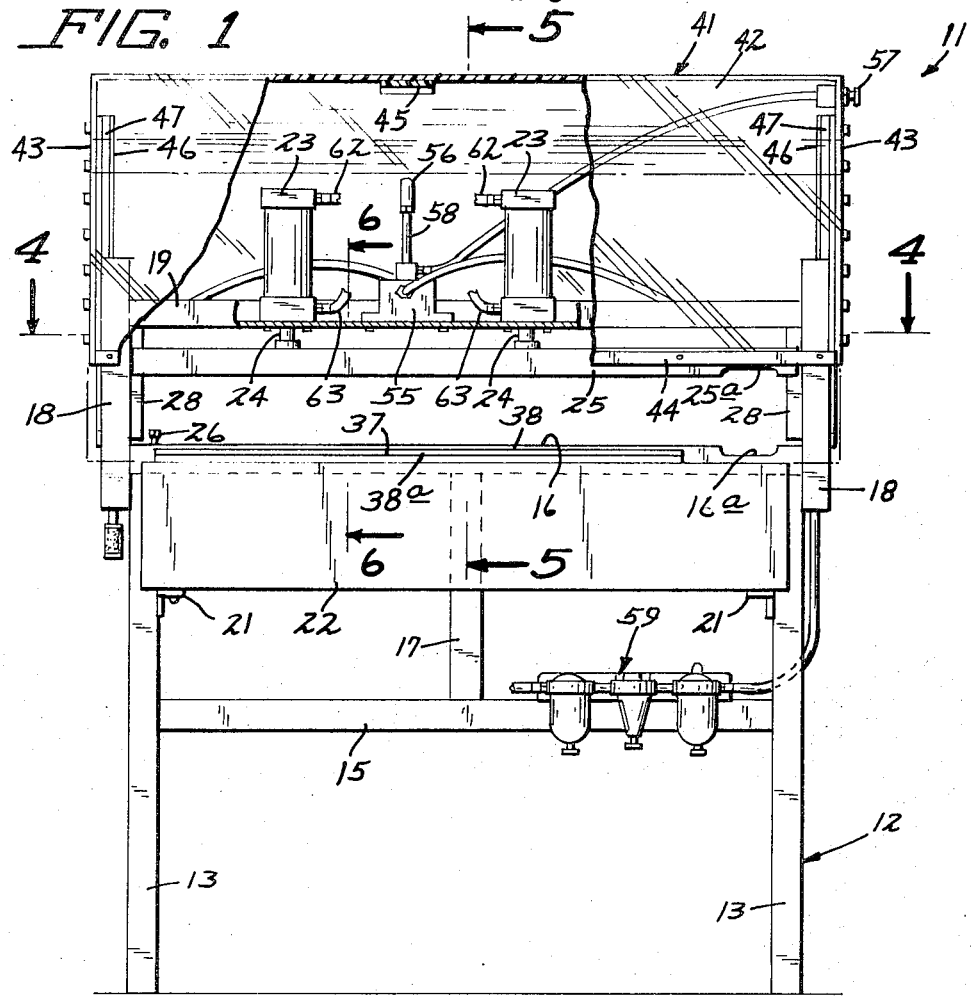
FIG. 1 is a view in side elevation of article loading apparatus embodying the inventive principle, portions thereof broken away.
Figure 2:
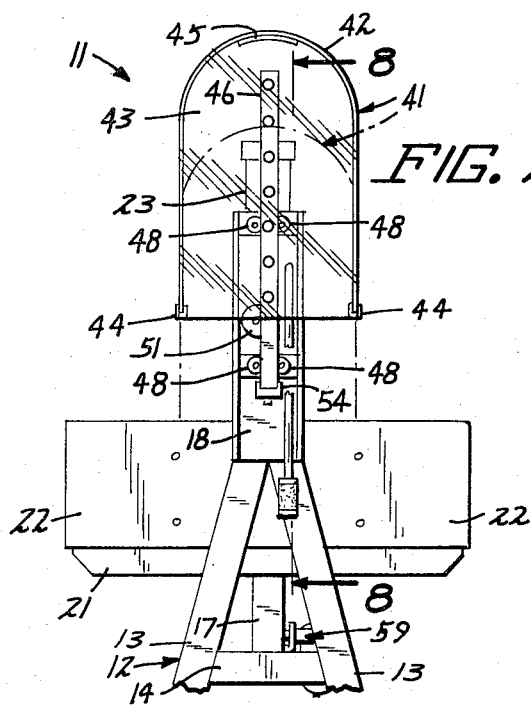
FIG. 2 is an elevation of the inventive apparatus as viewed from the left end of FIG. 1, portions thereof being broken away.
Figure 3:
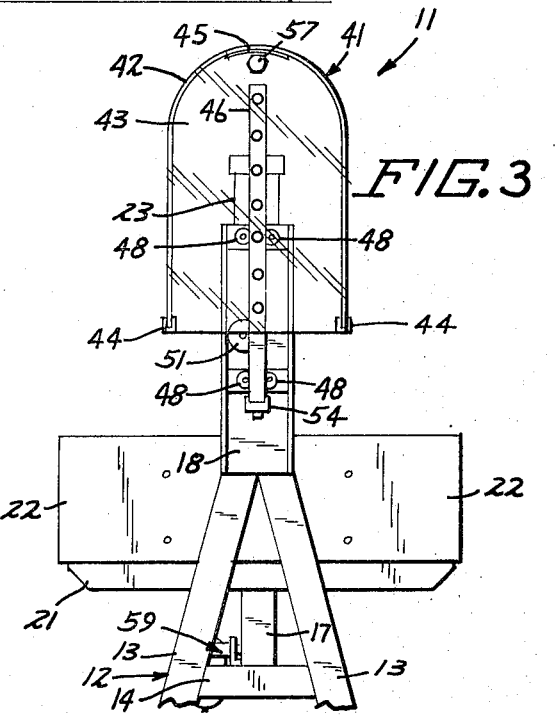
FIG. 3 is an elevation of the inventive apparatus as viewed from the right end of FIG. 1, portions thereof broken away.

With initial reference to FIGS. 1-3, an article loading apparatus embodying the inventive principle is represented generally by the numeral 11. Apparatus 11 comprises a frame 12 formed from four legs 13 arranged in pairs which diverge in sawhorse fashion. A short strut member 14 connects each pair of legs at an intermediate point of their length, and the two strut members 14 are in turn connected by a cross support member 15.

Figure 5:
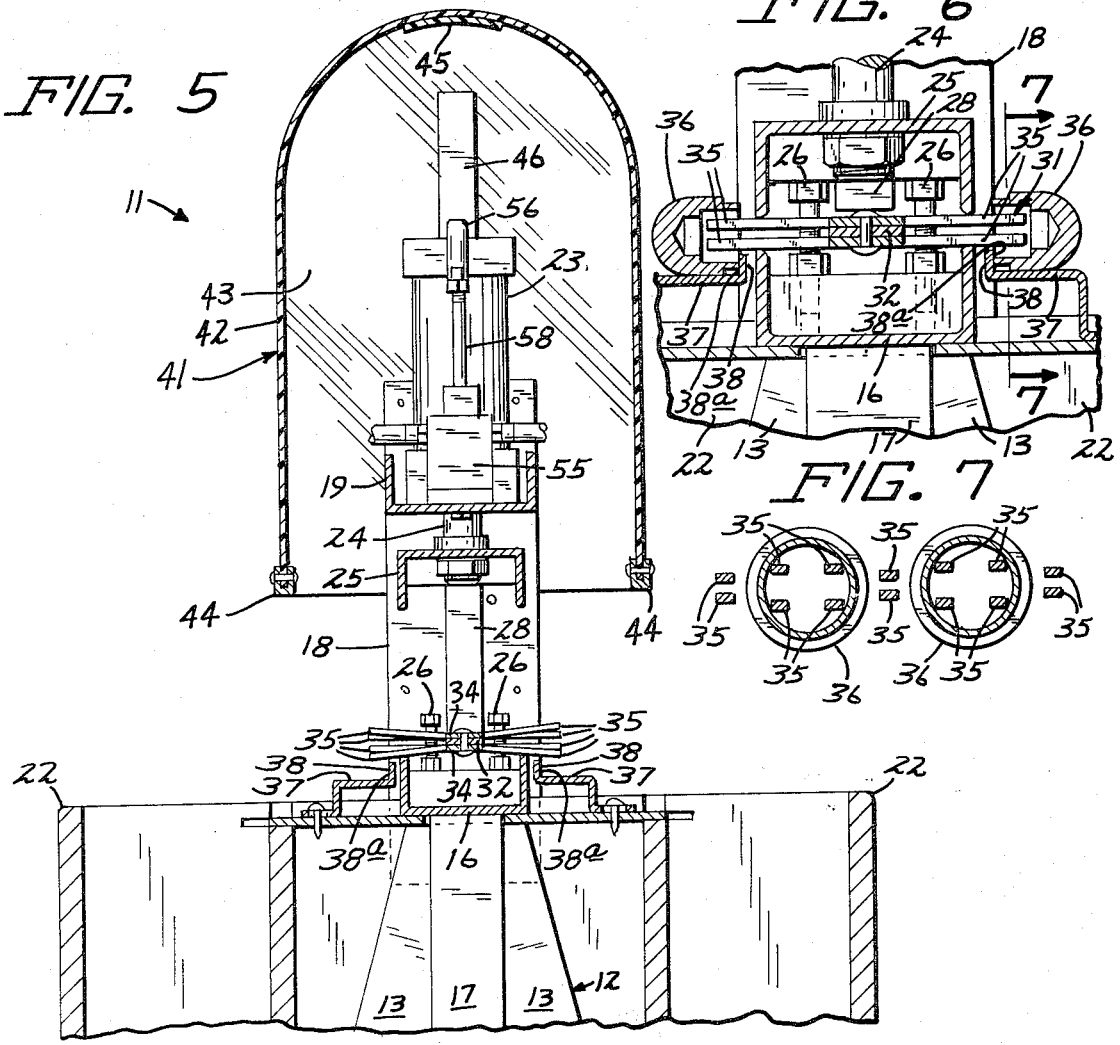
FIG. 5 is an enlarged sectional view taken along the line 5—5 of FIG. 1, portions being broken away.

Secured to the apex of each pair of legs 13 is an elongated channel member 16, the channel of which faces upwardly as best shown in the sectional view of FIG. 5. Channel member 16 serves as the lower stationary member of a pneumatically operated press, as will be described in further detail below. For additional support purposes, a vertical strut 17 is secured between channel member 16 and the cross support member 15.

Figure 4:
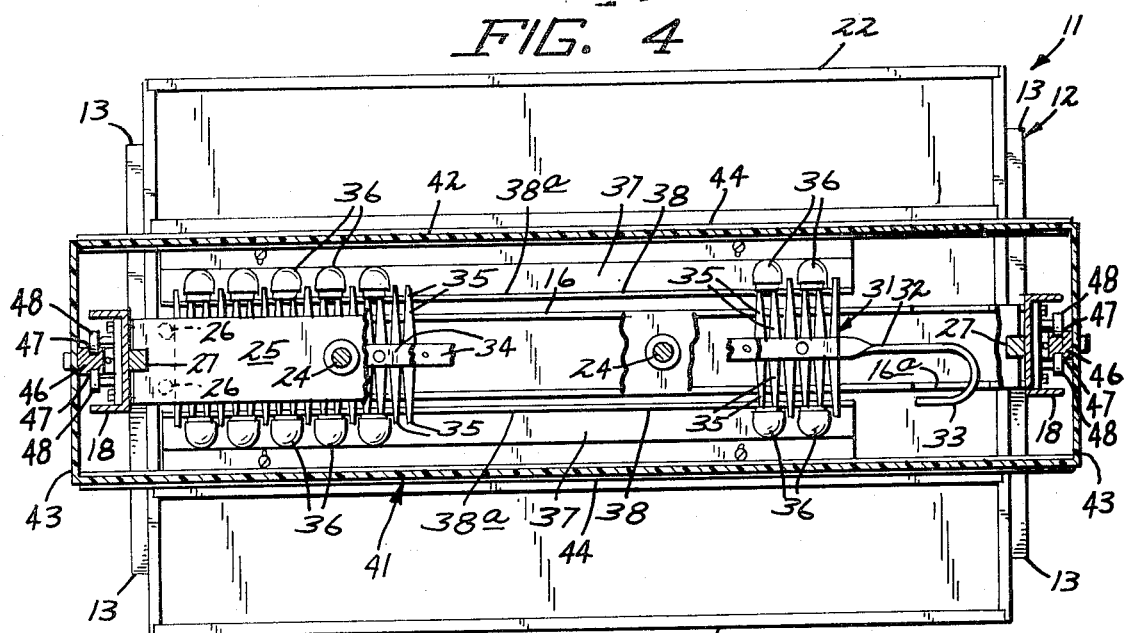
FIG. 4 is an enlarged sectional view taken along the line 4—4 of FIG. 1.

A somewhat wider channel member 18 is secured to the outer faces of each pair of legs 13 at their upper end, the members 18 projecting upward and having their channels facing outward (FIG. 4). An elongated, horizontally disposed channel beam 19 interconnects the channel members 18, and has its channel facing up (FIG. 5).

A short length of angle iron 21 is secured to the inner face of each pair of legs 13 in a horizontal position as best shown in FIG. 1. These angle iron lengths 21 serve as mounting brackets for elongated side boxes 22, which are adapted to store articles to be anodized.

With additional reference to FIGS. 4 and 5, a pair of pneumatic piston-cylinder actuators 23 are mounted in spaced relation within the channel of channel beam 19. Each of the pneumatic actuators includes an extensible shaft 24 which is affixed to a horizontal channel beam 25, the channel of which faces downward as shown in FIG. 5. Channel beam 25 is of the same cross sectional size as channel beam 16, and the two cooperate in a press relationship upon operation of the pneumatic actuators 23. A pair of adjustable stops 26 mounted on the channel member 16 (FIGS. 1 and 6) limit movement of the channel beam 25 relative to the channel beam 16 for a purpose described below.

Each end of the channel beam 25 includes a notch 27 (FIG. 4) which cooperates with a guide bar 28 to insure that movement relative to the channel member 16 is aligned.

An article supporting rack with which the apparatus 11 is used is represented generally by the numeral 31 in FIGS. 4 and 5. Rack 31 comprises a length of flat bar stock 32 having a hook 33 formed at one end permitting it to be hung during an anodizing process. Fastened to each side of the bar stock 32 is a length of spring sheet metal 34 the longitudinal edges of which define a plurality of transversely extending fingers 35. The spring metal lengths 34 are mounted in opposition to define a plurality of finger pairs; and, as best shown in FIG. 5, the fingers 35 of each pair diverge slightly.

Figure 6:
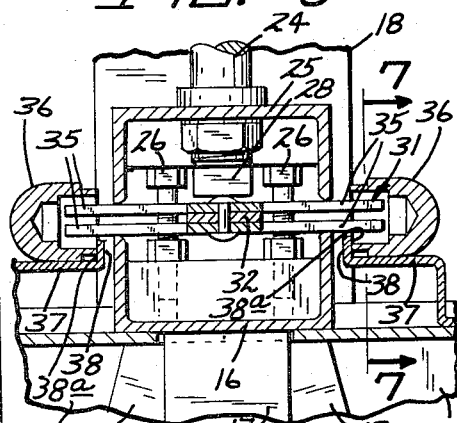
FIG. 6 is an enlarged fragmentary sectional view taken along the line 6—6 of FIG. 1.
Figure 7:
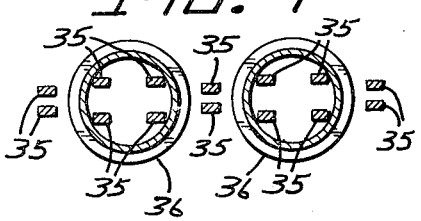
FIG. 7 is a further enlarged fragmentary sectional view taken along the line 7—7 of FIG. 6.

With additional reference to FIGS. 6 and 7, the several pairs of fingers 35 are adapted to receive and hold a plurality of articles 36 during the anodizing process. The specific article 36 disclosed are simply representative of many types of such articles; and, as shown in FIG. 7, each of the articles 36 requires two pairs of fingers 35 for its support, and two such articles 36 are spaced apart by one finger pair.

The primary function of apparatus 11 is to simultaneously compress all of the pairs of fingers 35 on rack 31, which has heretofore been a manual process. As shown in FIGS. 4 and 5, the channel members 16 and 25 are sized to receive the rack 31 in a longitudinal position, and operation of the pneumatic cylinders 23 serves to simultaneously squeeze the finger pairs together to permit the articles 36 to be placed thereover (FIG. 6). To assist in the placement of articles 36, a flat, elongated table member 37 is secured along each underside of the channel members 16, and each of the table members 37 in turn supports an elongated stop 38 (FIG. 5). The stops 38 each terminate in a vertical stop portion 38a against which the articles 36 abut when they are placed over a pair of compressed fingers 35 (FIG. 6). Release of the finger pairs, as effected by upward movement of the pneumatic actuators 23 and channel member 25, permits the fingers 35 to spring outwardly into engagement with the article 36 in supporting relationship.

With continued reference to FIGS. 1–5, apparatus 11 further comprises a transparent cover 41 which is moveable between an upper position to permit the placement of articles 36 on rack 31, and a lower position (see the phantom lines of FIG. 2) in which the moving portions are entirely surrounded for safety purposes. Although cover 41 can take a number of different shapes, in the embodiment disclosed it consists of a rounded top member 42 and a pair of flat, vertical ends 43 secured thereto. The top member 42 and ends 43 are formed from transparent material such as Uvex or Plexiglas, and longitudinal edge reinforcements 44 and a top reinforcement 45 are included for protective purposes.

Figures 8, 9:
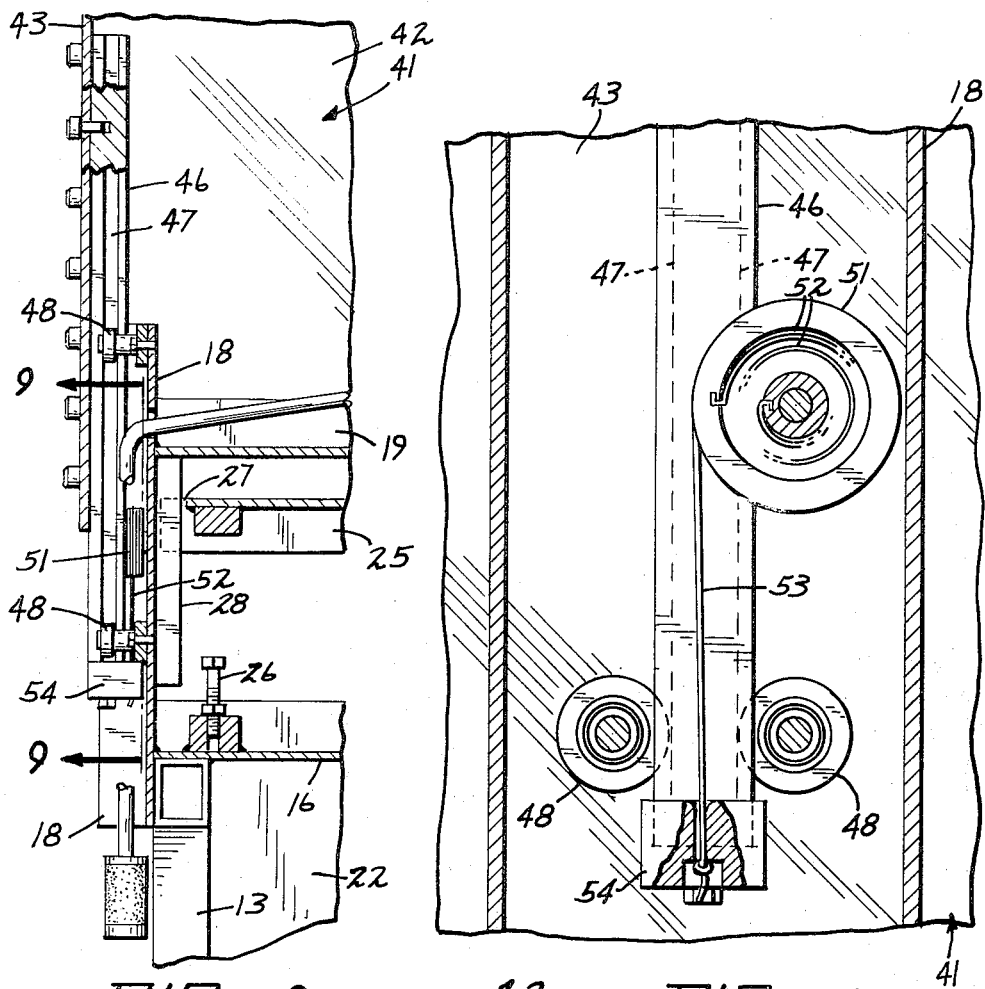
FIG. 8 is an enlarged fragmentary sectional view taken along the line 8—8 of FIG. 2.
FIG. 9 is a further enlarged fragmentary sectional view taken along the line 9—9 of FIG. 8.

With additional reference to FIGS. 8 and 9, an elongated guide bar 46 is bolted to the inner face of each of the ends 43 in a vertical position. Each of the guide bars 46 projects below the lowermost portion of cover 41, and each includes a longitudinal groove 47 along each side thereof. Two pairs of rollers 48 are rotatably mounted in the channel of each of the channel members 18, such roller pairs being spaced to fit into the grooves 47 and thereby rollably guide the bar 46.

Also disposed within the channel of each vertical channel member 18 is a pulley 51 which is rotatably mounted on a torsion spring 52 (FIG. 9). Pulley 51 carries a length of thin cable or rope 53, the extreme end of which is secured to a cap 54 fitting over the bottom end of guide bar 46. Torsion spring 52 is arranged to exert an increasing upward spring force on the cover 41 as it is lowered. The spring constant of torsion spring 52 is chosen so that it generates an upward force proportional to weight of the cover 41, thus allowing it to be raised and lowered with ease.

Pneumatic actuators 23 are controlled by a two position four way valve 55 which is mounted between the actuators 23 within the channel of channel beam 19 (FIG. 1). Control valve 55 is in turn operated by pilot pressure as determined by a first pneumatic bleed button 56 and a second pneumatic bleed button 57. As best shown in FIG. 1, pneumatic bleed button 56 is mounted on the top of a vertical post 58 which projects from the top of control valve 55. The height of pneumatic button 56 permits it to be engaged by the top reinforcement 45 as cover 41 is lowered, and it is this engagement which initiates operation of the apparatus 11. Pneumatic bleed button 57 is mounted in an externally accessible position at the top of one of the ends 43 of cover 41. Air is supplied to the pneumatic actuators 23, control valve 55 and pneumatic buttons 56, 57 through conventional apparatus for filtering and regulating the air which is designated 59 in FIG. 1. An air muffler 60 attenuates the sound of air as it is exhausted from the system, as will be described in detail below.

Figure 10:
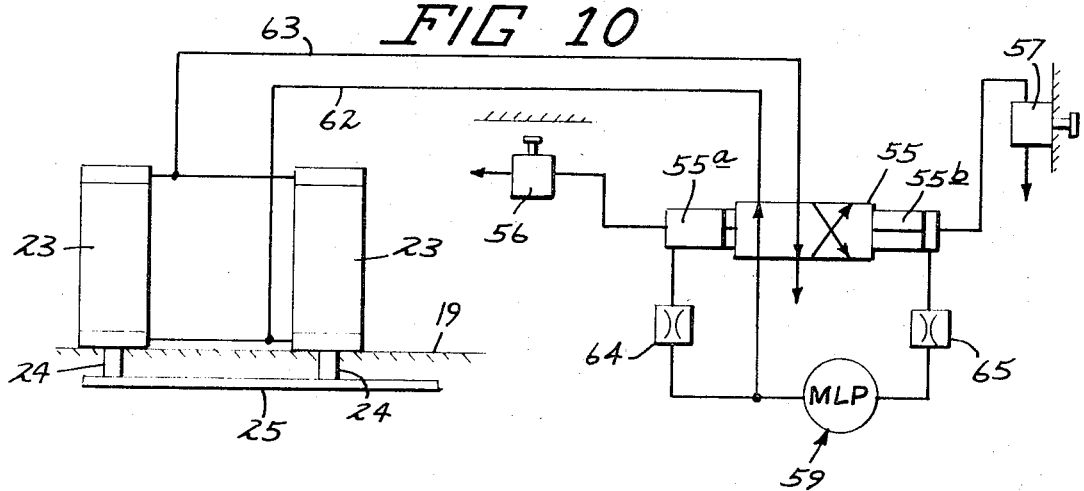
FIG. 10 is a schematic representation of a control circuit for the article loading apparatus.

FIG. 10 is a schematic representation of control circuitry for the apparatus 11. As is shown, the two pneumatic cylinders 23 are connected to the control valve 55 by pneumatic conduits 62, 63; and the position of control valve 55 determines whether the actuators 23 will be extended or retracted to lower or raise channel member 25. Control valve 55 has opposed pilot pressure chambers 55a, 55b, and its position is determined by the pilot pressure in such chambers. As is shown, control valve 55 is a two position, four way valve which controls the delivery of mainline pressure (MLP) from filtering and regulating apparatus 59 to the respective conduits 62, 63. Mainline pressure is also supplied to the pilot pressure chambers 55a, 55b through restrictions 64, 65, respectively to establish a control or pilot pressure in these chambers.

Pneumatic bleed button 56 is connected to pilot pressure chamber 55a through a suitable conduit, and its operation through engagement by the top reinforcement 45 of cover 41 serves to bleed pressure out of the pilot chamber 55a. Similarly, pneumatic bleed button 57 is connected to a suitable conduit to pilot pressure chamber 55b, and its manual operation also serves to bleed pressure from its associated pilot pressure chamber. Pneumatic bleed button 56, 57 are both normally closed, so that pilot pressure in the respective pilot chambers 55a, 55b is normally equal to mainline pressure. The normal position of control valve 55 is shown in FIG. 10, with mainline pressure supplied through conduit 62 and vented from conduit 63 to maintain the channel member 25 in upper or retracted position.

In the overall operation of apparatus 11, an empty rack 31 is placed onto the channel member 16 as shown in FIG. 4, with the hook 33 projecting from a notch 16a provided for such purpose. The operator then lowers transparent cover 41 until pneumatic button 56 is engaged by the top reinforcement 45 which, as pointed out above, bleeds pressure from pilot chamber 55a. Because pressure in pilot chamber 55b is at a maximum, control valve 55 shifts from right to left as viewed in FIG. 10, thus transferring mainline pressure to conduit 63 and enabling conduit 62 to be vented. The result is to extend pneumatic actuators 23 and move channel member 25 to its lower or clamping position against the spring fingers 35 (FIG. 6). A notch 25a is provided in channel member 25 to receive hook 33. At this point, the operator can safely raise the cover 41 and proceed with taking articles 36 from the side boxes 22 and placing them over the several pairs of fingers 35 of rack 31. Although pneumatic button 56 at this time returns to its normally closed state, this has no effect on the position of control valve 55 so long as pressure remains in pilot chamber 55b.

After the rack 31 has been filled, the operator depresses pneumatic button 57 to bleed pressure from pilot chamber 55b. This enables the pressure in pilot chamber 55a to return the control valve 55 to the position shown in FIG. 10, resulting in retraction of the channel member 25. The filled rack 31 can then be removed with articles 36 properly supported for the anodizing process.

Figure 11:
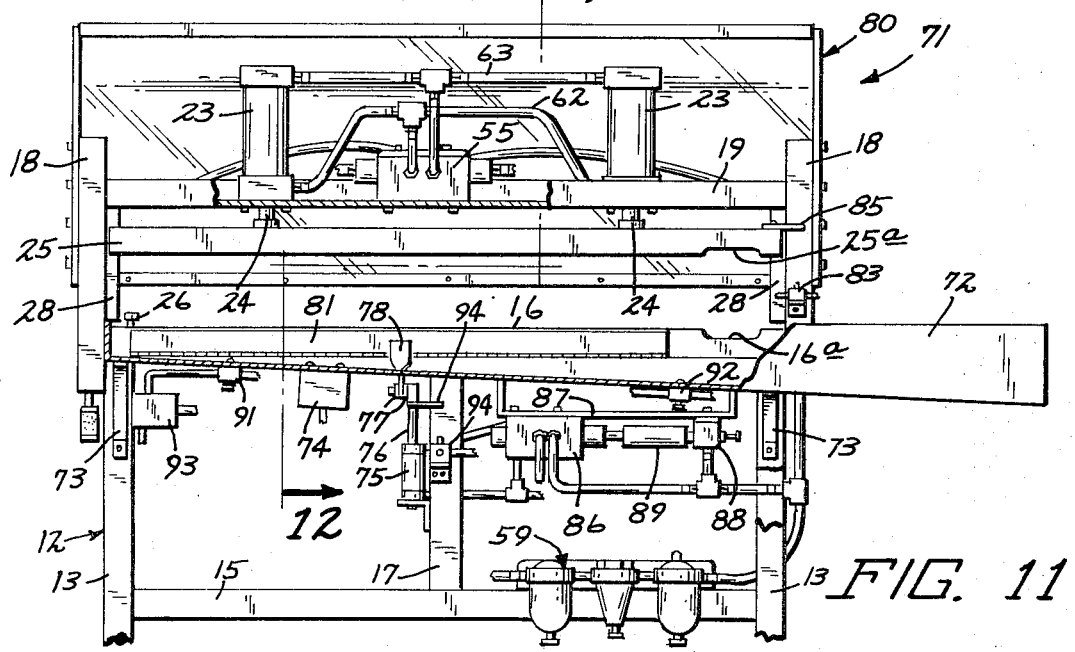
FIG. 11 is a view in side elevation of article unloading apparatus embodying the inventive principle, portions thereof being broken away.
Figure 12:
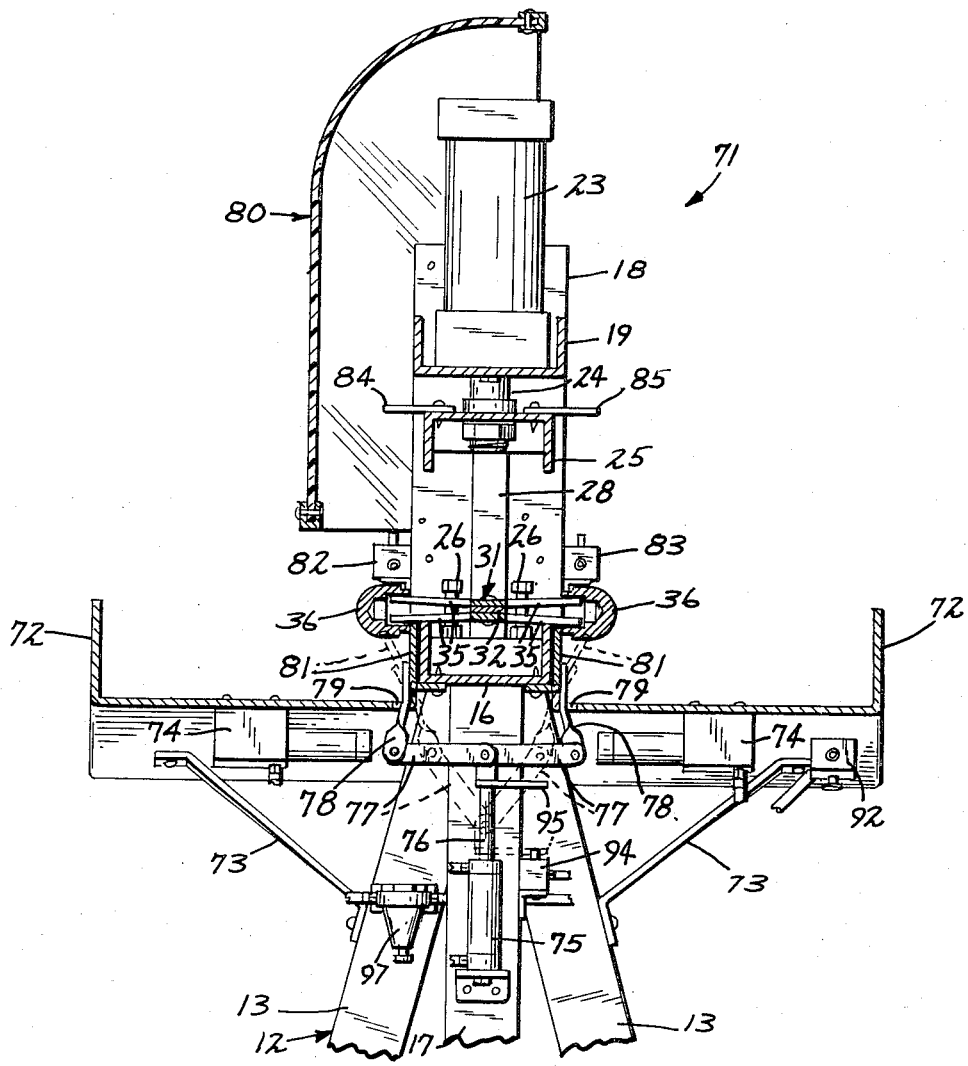
FIG. 12 is an enlarged fragmentary sectional view taken along the line 12—12 of FIG. 11.

Apparatus for removing the articles 36 from the rack 31 after anodization is represented generally by the numeral 71 in FIGS. 11 and 12. With certain exceptions as noted below, apparatus 71 is similar to apparatus 11 and it includes certain additional structure for effecting the automatic removal of articles 36. Those components of apparatus 71 which are identical to those of apparatus 11 retain the same reference numerals.

Apparatus 71 includes a transparent lid 80; but, as shown in FIGS. 11 and 12, lid 80 extends only over the backside of the clamping apparatus and is immovably secured to the side channel members 18. Coupled with the control circuitry described below, lid 80 offers full protection to the operator.

Instead of the table members 37, elongated stops 38 and side boxes 22, appaaratus 71 has a partially enclosed longitudinal ramp 72 secured to each side of the channel members 16. The ramps 72 are supported by brackets 73 secured to the ramp bottom and to each of the legs 13. Each of the ramps 72 further includes a pneumatic vibrator 74 which assists movement of the anodized articles 36 down the ramp to a desired collection area.

As shown in FIG. 12, apparatus 71 further includes a pneumatic actuator 75 which is mounted in a vertical position on the vertical strut members 17 of frame 12. Pneumatic actuator 75 has an extensible rod 76 to which a pair of linkage members 77 are pivotally connected. Each of the linkage members 77 is in turn pivotally connected to a second linkage member 78 which projects through an opening 79 in the bottom of ramp 72 (see also FIG. 11). Each of the linkage members 78 is affixed to an elongated kick-out member 81 which is continuously hinged for outward swinging movement. The extreme upper edge of kick-out member 81 is normally disposed immediately behind each of the anodized articles 36, so that retraction of the pneumatic cylinder 75 operates through the linkage members 77, 78 to swing kick-out member outwardly to effect simultaneous removal of the articles 36 from the rack 31. The kick-out position of pneumatic cylinder 75 and its related components is represented by phantom lines in FIG. 12.

Apparatus 71 further comprises a pair of pneumatic switches 82, 83 which are mounted on opposite sides of the channel member 18 (FIG. 12). The pneumatic switches 82, 83 are respectively actuated by strike members 84, 85 which are mounted on opposite sides of the moveable channel member 25 immediately over the switches 82, 83.

Also included in the control circuitry for apparatus 71 is a control valve 86 mounted on a bracket 87 secured to the underside of frame 12. Control valve 86 is a two position, three way valve (as will be described in further detail below), and its position controls the extension and retraction of pneumatic actuator 75. The position of control valve 86 is determined by pneumatic switch 82, which is connected thereto through a variable restriction 88 and a capacitor 89, both of which are supported by the bracket 87.

Apparatus 71 includes no lid actuated switch, and the position of valve 55 is controlled in part by manually operable switches 91, 92 and a pressure actuated valve 93. Pneumatic switches 91, 92 are mounted in spaced apart relation on the bottom side of the ramp 72 facing the operator, and pressure actuated valve 93 is secured to the frame 12. The position of valve 55 is also controlled by a pneumatic switch 94, which is mounted on the vertical strut 17 in a position for engagement by a strike 95 secured to the upper end of pneumatic actuator rod 76.

Figure 13:
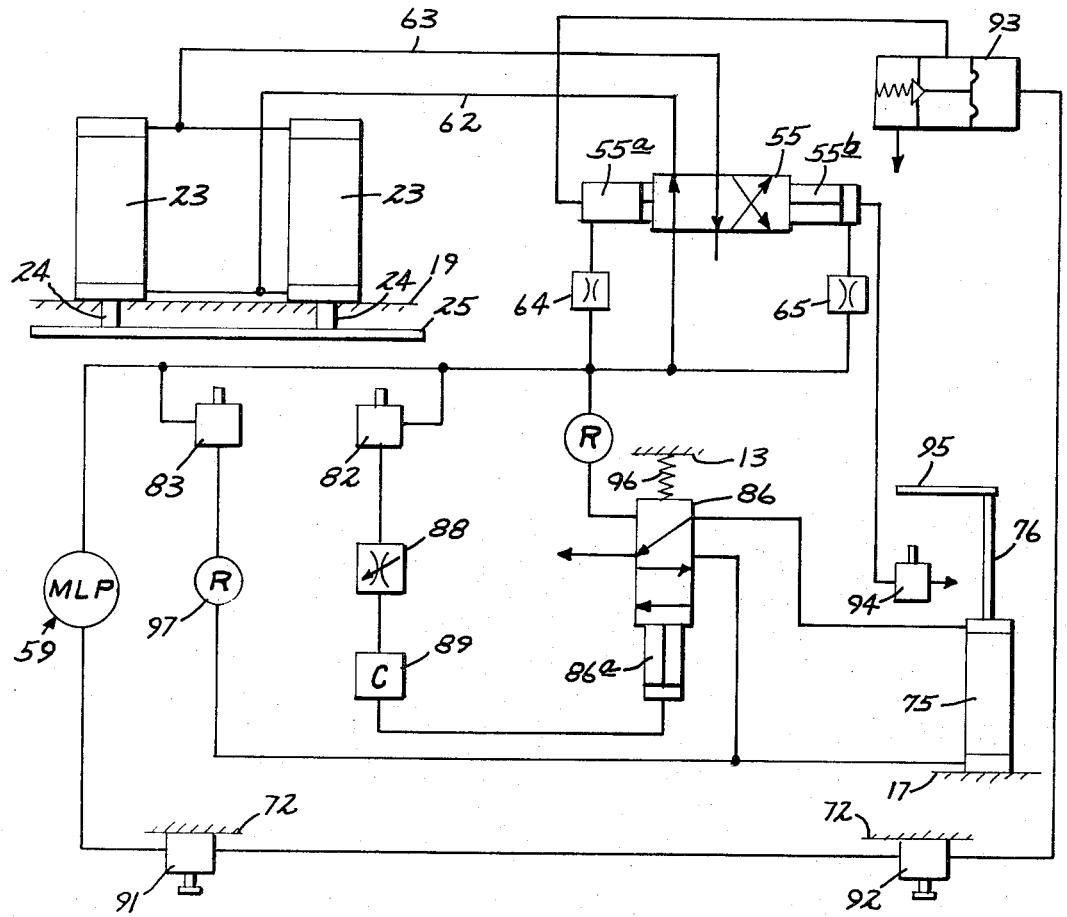
FIG. 13 is a schematic representation of a control circuit for the article loading apparatus.

With reference to FIG. 13, the connection of pneumatic cylinder 23 to control vavle 55 through conduits 62, 63 is the same as apparatus 11, the position of control valve 55 determining which of the conduits 62, 63 receives mainline pressure from the source 59. The position of control valve 55 is again controlled by the magnitude of pressure in pilot chambers 55a, 55b, each of which is supplied from the pressure source 59 through restrictions 64, 65, respectively. However, the manner of switching control valve 55 of apparatus 17 is altered somewhat as compared with apparatus 11, since the lid 80 is not moveable. Specifically, the manually operated switches 91, 92 are connected in series between the pressure source 59 and pressure actuated bleed valve 93. Switches 91, 92 are normally closed, and they must be operated simultaneously (as an "and" gate) to pass pressure to valve 93, which is also normally closed. Upon receiving pressure through switches 91, 92, valve 93 is actuated to an open position, thus bleeding the pressure from pilot chamber 55a. As described above, this switches valve 55 to a position which supplies mainline pressure to conduit 63 and vents conduit 62, thereby extending pneumatic actuators 23 and dropping the channel member 25 into a clamping position. Retraction of the actuators 23 is brought about by operation of the pneumatic switch 94, which occurs as pneumatic cylinder 75 retracts.

The operation of pneumatic cylinder 75 is controlled by pneumatic switches 82, 83 and the two position, three way control valve 86. Switch 93 is normally open, switch 92 is normally closed, and valve 86 is normally urged to the position shown in FIG. 13 by a spring 96. Accordingly, switch 93 normally conducts mainline pressure through a regulator 97 to the lower port of pneumatic cylinder 75 to maintain it in an extended position. The upper port of cylinder 75 is vented through valve 86 at this time.

As channel member 25 is moved to its clamping position by pneumatic cylinders 23, its strikes pneumatic switches 82, 83 and holds them in a depressed position. This closes switch 83 and cuts off mainline pressure to the lower port of cylinder 75. Switch 82 is simultaneously opened; and after a predetermined time delay determined by the restriction 88 and capacitor 89, mainline pressure reaches a pilot chamber 86a of the control valve 86. Such pressure drives valve 86 to its opposite position, and mainline pressure is thereafter conducted through a regulator 98 to the upper port of cylinder 75, the lower port being vented through valve 86. Accordingly, pneumatic cylinder 75 retracts to actuate the kick-out member 81, and the strike 95 depresses switch 94. This bleeds pressure from pilot chamber 55b, and valve 55 thus switches to retract pneumatic actuators 23. This releases switch 82, 83 permitting switch 83 to again conduct regulated mainline pressure to the lower port of cylinder 75. In its closed position, switch 82 is capable of bleeding pressure from the conduit leading to pilot chamber 86a, which allows the biasing spring 96 to return valve 86 to its normal position as shown in FIG. 13. Thus, the upper port of cylinder 75 is vented through valve 86, and due to the pressure supplied through switch 83, cylinder 75 extends to retract the kick-out member 81.

The overall operation of apparatus 71 will be clear from the foregoing. A rack 31 with anodized articles 36 is placed by the operator on channel member 16 as shown in FIG. 12. The operator then simultaneously depresses the pneumatic switches 91, 92 to initiate operation of the machine. By reason of the spaced mounting of switches 91, 92 on the underside of ramp 72, it is impossible for the operator to have his hands in the clamping area while initiating operation in the machine. As described, depressing the switches 91, 92 actuates the pressure actuated bleed switch 93, and the position of control valve 55 is thereby changed to extend pneumatic actuators 23 and move channel member 25 to its clamping position to sqeeze the severeal finger pairs of rack 31. At this time, channel member 25 also simultaneously strikes pneumatic switches 82, 83; and after the short time delay as determined by restriction 88 and capacitor 89, pneumatic cylinder 75 is retracted to swing kick-out member 81 outward into engagement with the anodized articles 36, dropping them onto the respective ramps 72 where they are vibrated downwardly into a collection area.

As pneumatic cylinder 75 retracts, it strikes switch 94 to reverse the position of valve 55 and cause pneumatic cylinders 23 to retract. In so doing, pneumatic switches 82, 83 are released, and pneumatic cylinder 75 is returned to its normally extended position with kick-out member 81 retracted accordingly. This ends the cycle of operation, and upon removal of the empty rack 31, apparatus 71 is ready to repeat the cycle.

We claim:

1. Apparatus for compressing article holding racks having a plurality of resilient finger pairs arranged in opposed, longitudinal rows, the fingers of each pair being mutually compressible to receive and retain an article, said apparatus comprising:
   a. a frame comprising an overhead support member;
   b. a first clamping member carried by the frame in a stationary position and constructed to engageably receive one finger of each finger pair;
   c. a second clamping member carried by the frame for movement relative to the first clamping member in clamping relation therewith, the second clamping member constructed to depressibly engage the other finger of each finger pair;
   d. the first and second clamping members comprising elongated channel members disposed horizontally below said overhead support member with their channels in opposed relation;
   e. power means comprising at least one actuator mounted on the overhead support member for moving the second channel member between clamping and non-clamping positions, the second channel member being operatively connected to the actuator for vertical movement thereby;
   f. shield means carried by the frame means for vertical movement between a first position protectively surrounding the clamping members and a second position permitting accessibility thereto;
   g. and means for controlling movement of the power means, the controlling means inclding switching means engageable by the shield means in said second position to initiate movement of the second clamping member to said clamping position.

2. The apparatus defined by claim 1, wherein the shield means is transparent.

3. The apparatus defined by claim 1 and further comprising means for holding said shield means in said first and second positions.

4. The apparatus defined by claim 3, wherein said holding means comprises:
   a. a wheel member carried by the frame and disposed for rotatable engagement by said shield means;
   b. a torsion spring operably connected between the frame and wheel member;
   c. and a cable having one end operably connected to the wheel member and windable thereon, the opposite end of the cable being secured to the shield means for movement therewith.

5. The apparatus defined by claim 1, wherein the shield means comprises at least one vertically disposed guide member, and the frame comprises a plurality of rollers disposed for guiding engagement with said guide member.

6. The apparatus defined by claim 1, wherein the controlling means further comprises manually operable switch means for initiating movement of the second channel member to said non-clamping position.

7. The apparatus defined by claim 6, wherein the mutually operable switch means is mounted in an externally accessible position of the shield means.

8. The apparatus by claim 1, and further comprising container means carried by the frame means proximate said channel members for holding articles prior to placement on a rack.

9. Apparatus for compressing article holding racks having a plurality of resilient finger pairs arranged in opposed, longitudinal rows, the fingers of each pair being mutually compressible to receive and retain an article, said apparatus comprising:
   a. a frame;
   b. a first clamping member carried by the frame in a stationary position and constructed to engageably receive one finger on each finger pair;

c. a second clamping member carried by the frame for movement relative to the first clamping member in clamping rotation therewith, the second clamping member being constructed to depressibly engage the other finger of each finger pair;

d. power means for moving said second clamping member between clamping and non-clamping positions;

e. means for engageably removing articles from said resilient finger pairs when compressed;

f. and control means for actuating the power means to move the second clamping member to said clamping position, for actuating the article removing means after the second clamping member has reached said clamping position, and for actuating the power means to move the second clamping member to said unclamping position following actuation of the article removing means.

10. The apparatus defined by claim 9, wherein the article removing means comprises:

a. a kick-out member for each longitudinal row of resilient finger pairs, each kick-out member mounted for movement between an extended article engaging position and a retracted position;

b. and second power means for moving the kick-out member between said extended and retracted positions.

11. The apparatus defined by claim 10, wherein the control means comprises:

a. first means responsive to movement of the second clamping member to the clamping position for effecting movement of the kick-out member to the extended position;

b. and second means for effecting movement of the kick-out member to the retracted position after a predetermined delay has elapsed.

12. The apparatus defined by claim 11, wherein:

a. first means comprises first switch means disposed for engagement by the second clamping member in said clamping position;

b. and the second means comprises second switch means disposed for engagement by the second clamping member in said clamping position, and a time delay circuit operating in conjunction with the second switch means.

13. The apparatus defined by claim 10, wherein the first and second power means and the control means are pneumatically operated.

14. The apparatus defined by claim 10, wherein the control means comprises switch means responsive to movement of the kick-out member to said extended position for initiating movement of the second clamping member to the unclamping position.

15. The apparatus defined by claim 10, wherein the kick-out members are pivotally mounted on opposite sides of the first clamping member for swinging movement relative thereto, and the second power means comprises linkage means commonly connecting the kick-out member for simultaneous swinging movement thereof.

16. The apparatus defined by claim 9, wherein the control means further comprises first and second manually operable switch means disposed remotely of said clamping members and mounted in spaced apart relation, said first and second switch means being constructed and arranged to initiate movement of the second clamping member to said clamping position upon simultaneous manual operation thereof.

17. The apparatus defined by claim 10, and further comprising:

a. ramp means carried by the frame and disposed below the kick-out member to receive articles removed from the rack;

b. and means for vibrating the ramp means to effect movement of said articles thereon.

18. The apparatus defined by claim 9, wherein the first and second clamping member comprise horizontally disposed, elongated channel members, the channels thereof being disposed in opposed relation.

19. The apparatus defined by claim 9, and further comprising shield means for protectably surrounding at least a portion of said first and second clamping members.

20. Apparatus for compressing article holding racks having a plurality of resilient finger pairs arranged in opposed, longitudinal rows, the fingers of each pair being mutually compressible to receive and retain an article, said apparatus comprising:

a. a frame;

b. a first clamping member carried by the frame in a staationary position and constructed to engageably receive one finger of each finger pair;

c. a second clamping member carried by the frame for movement relative to the first clamping member in clamping relation therewith, the second clamping member being constructed to depressibly engage the other finger of each finger pair;

d. power means for moving said second clamping member between clamping and non-clamping positions e. and means for engageably removing articles from said resilient finger pairs when compressed, said article removing means comprising an elongated kick out member for each longitudinal row of resilient finger pairs and disposed in parallel relation therewith, each kick ouot member being mounted for movement between an extended article engaging position and a retracted position, and second power means for moving the kick out members between said extended and retracted positions.

21. Apparatus for compressing article holding racks having a plurality of resilient finger pairs arranged in opposed, longitudinal rows, the fingers of each pair being mutually compressible to receive and retain an article, said apparatus comprising:

a. a frame;

b. a first elongated channel member carried by the frame in an essentially horizontal stationary position to receive one finger of each finger pair;

c. a second elongated channel member carried by the frame in an essentially horizontal position in opposed relation to the first channel member, the second channel member having movable relative to the first channel member in clamping relation therewith to depressibly engage the other finger of each finger pair;

d. power means for moving said second channel member between clamping and non-clamping positions;

e. and means for engageably removing articles from said resilient finger pairs when compressed.

22. Apparatus for compressing article holding racks having a plurality of resilient finger pairs arranged in opposed, longitudinal rows, the fingers of each pair being mutually compressible to receive and retain an article, said apparatus comprising:
   a. a frame;
   b. a first elongated channel member carried by the frame in an essentially horizontal stationary position to receive one finger of each finger pair;
   c. a second elongated channel member carried by the frame in an essentially horizontal position in opposed relation to the first channel member, the second channel member being movable relative to the first channel member in clamping relation therewith to depressibly engage the other finger of each finger pair;
   d. power means for moving said second channel member between clamping and non-clamping positions;
   e. and means for controlling movement of the power means, the controlling means being manually operable to initiate movement of the power means and including safety means for precluding accessibility of an operator to said channel members until the second channel member is in clamping position.

* * * * *